(12) United States Patent
Johnson et al.

(10) Patent No.: US 10,067,278 B2
(45) Date of Patent: Sep. 4, 2018

(54) BIREFRINGENT POLYESTER FILM WITH LOW HAZE HAVING SPECIFIED TAN DELTA VALUE

(71) Applicant: 3M INNOVATIVE PROPERTIES COMPANY, St. Paul, MN (US)

(72) Inventors: Stephen A. Johnson, Woodbury, MN (US); Ryan T. Fabick, Shoreview, MN (US); Edward J. Kivel, Stillwater, MN (US); Victor Ho, St. Paul, MN (US); Benjamin J. Bending, Madison, WI (US); Christopher W. A. Krohe, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 226 days.

(21) Appl. No.: 14/974,198

(22) Filed: Dec. 18, 2015

(65) Prior Publication Data

US 2017/0176658 A1    Jun. 22, 2017

(51) Int. Cl.
*G02B 5/30* (2006.01)
*G02B 1/04* (2006.01)
*C08J 5/18* (2006.01)
*G02B 1/08* (2006.01)
*B32B 27/08* (2006.01)
*G02B 27/28* (2006.01)

(52) U.S. Cl.
CPC ............ *G02B 5/3083* (2013.01); *B32B 27/08* (2013.01); *C08J 5/18* (2013.01); *G02B 1/04* (2013.01); *G02B 1/08* (2013.01); *C08J 2333/12* (2013.01); *C08J 2367/02* (2013.01); *G02B 27/28* (2013.01)

(58) Field of Classification Search
CPC ........ B29D 11/00634; B29D 11/00644; B29K 2067/00; B29K 2067/003; B29K 2067/006; B29K 2067/04; B29K 2867/00; B29K 2867/003; B29K 2867/006; B29K 2867/04; B29K 2995/003; B29K 2995/0032; B29K 2995/0034; B32B 27/08; B32B 27/36; B32B 2307/42; B32B 2333/12; B32B 2367/00; C08J 2333/12; C08J 2367/02; C08J 5/18; G02B 1/04; G02B 1/08; G02B 5/285; G02B 5/3033; G02B 5/3041; G02B 5/305; G02B 5/3058; G02B 5/3083; G02B 27/28; G02B 27/288; G02F 1/133528; G02F 1/133533; G02F 1/133536; G02F 1/13363; G02F 2001/133637; G02F 2202/40
USPC ........... 252/585; 349/96, 194; 359/352, 359, 359/489.01, 489.15, 489.16, 489.19; 428/1.131, 480, 483
See application file for complete search history.

(56) References Cited

U.S. PATENT DOCUMENTS

| | | |
|---|---|---|
| 5,474,854 A | 12/1995 | Kagami et al. |
| 6,129,961 A | 10/2000 | Sonoda et al. |
| 8,263,731 B2 | 9/2012 | Liu et al. |
| 2004/0219316 A1* | 11/2004 | Takahashi ............... B32B 15/08 428/35.7 |
| 2006/0270806 A1* | 11/2006 | Hale .......................... C08J 5/18 525/439 |
| 2009/0273836 A1* | 11/2009 | Yust ........................ B32B 27/08 359/489.04 |
| 2010/0277668 A1* | 11/2010 | Frank ........................ B32B 3/30 349/62 |

\* cited by examiner

*Primary Examiner* — Stephone B Allen
*Assistant Examiner* — Ryan S Dunning

(57) ABSTRACT

A birefringent polyester film includes naphthalate units, ethylene units, a titanate compound, a planar branching unit, and 1 to 80 ppm metal content. The birefringent polyester film has an out-of-plane birefringence of at least 0.1 at 633 nm.

14 Claims, No Drawings

BIREFRINGENT POLYESTER FILM WITH LOW HAZE HAVING SPECIFIED TAN DELTA VALUE

BACKGROUND

Polymeric films are used in a wide variety of applications. Multilayer polymeric optical films are widely used for various purposes, including as mirrors and polarizers. These films often have extremely high reflectivity, while being lightweight and resistant to breakage. Exemplary applications for these films include compact electronic displays, including liquid crystal displays (LCDs) placed in mobile telephones, personal data assistants, computers, televisions and other devices.

One type of polymer that is useful in creating polarizer or mirror films is a polyester. One example of a polyester-based polarizer includes a stack of polyester layers of differing composition. A polyester is prepared by reactions of one or more different dicarboxylate monomers (e.g., compounds with two or more carboxylic acid or ester functional groups) with one or more different glycol monomers (e.g., compounds with two or more hydroxy functional groups). One example of a polyester useful in multilayer optical films is polyethylene naphthalate (PEN) which can be made, for example, by reactions of naphthalene dicarboxylic acid (or ester) with ethylene glycol.

SUMMARY

The present disclosure relates to birefringent polyester films that exhibit low optical absorption, high birefringence and low haze. These birefringent polyester films may also exhibit a high melt elasticity that can be similar to other polymer film layers for co-extrusion into multilayer films. The birefringent polyester film may include naphthalate units, ethylene units, a titanate compound, a planar branching unit, and 1 to 80 ppm metal content. The birefringent polyester film has an out-of-plane birefringence of at least 0.1 at 633 nm and a Tan Delta value in a range from 3 to 8.

In one aspect, a birefringent polyester film includes naphthalate units, ethylene units, a titanate compound, 0.1 to 2 mol % planar branching unit, based on total mol % of naphthalate and branching units, and 1 to 80 ppm metal content. The birefringent polyester film has an out-of-plane birefringence of at least 0.1 at 633 nm.

In another aspect, a multilayer film includes a first birefringent polyester layer having an out-of-plane birefringence of at least 0.10 at 633 nm, and a second polymer layer having a lower birefringence than the first birefringent polyester layer and disposed on the first birefringent polyester layer. The polyester layer includes naphthalate units, ethylene units, a titanate compound, 0.1 to 2 mol % planar branching unit, based on total mol % of naphthalate and branching units, and 1 to 80 ppm metal content.

In another aspect, a multilayer optical film includes a plurality of first birefringent polyester layers each having an out-of-plane birefringence of at least 0.10 at 633 nm and a metal content of less than 100 ppm, and having a first Tan Delta value at 280 degrees Celsius and a shear rate of 10 sec$^{-1}$, and a plurality of second isotropic acrylate layers alternating between first birefringent polyester layers and each second isotropic acrylate layer having a second Tan Delta value at 280 degrees Celsius and a shear rate of 10 sec$^{-1}$. The first Tan Delta value is within 30% or less of the second Tan Delta value.

These and various other features and advantages will be apparent from a reading of the following detailed description.

DETAILED DESCRIPTION

In the following detailed description, several specific embodiments are discussed. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

"Index of refraction," "refractive index," "index," or "RI", refers to a refractive index of a material in the plane of the material with respect to light at 633 nm and normal or near normal (for example, 8 degrees or less off-set) incidence, unless otherwise indicated.

"Birefringent" refers to the indices of refraction in orthogonal x, y, and z directions are not all the same. For the polymer layers described herein, the axes are selected so that x and y axes are in the plane of the layer and the z axis is normal to the plane of the layer and typically corresponds to the thickness or height of the layer. Birefringence values are reported with respect to light at 633 nm and normal incidence, unless otherwise indicated.

"High refractive index" and "low refractive index" are relative terms; when two layers are compared in both in-plane directions of interest, the layer that has a greater average in-plane refractive index is the high refractive index layer, and the layer that has a lower average in-plane refractive index is the low refractive index layer.

"Polymer" refers to, unless otherwise indicated, polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included, unless indicated otherwise.

"Polyester" refers to a polymer that contains an ester functional group in the main polymer chain. Copolyesters are included in the term "polyester".

"Tan Delta" value is the ratio of viscous modulus (G") to elastic modulus (G') and refers to the viscoelasticity of the polymer, where a lower Tan Delta value indicates a more elastic material. Tan Delta values reported or referred to herein are determined with an Ares Plate-on-Plate rheometer (commercially available from TA Instruments, New Castle, Del., USA) at a shear rate of 10 sec$^{-1}$ at 280 degrees Celsius.

The present disclosure relates to birefringent polyester films that exhibit low optical absorption, high birefringence and low haze. These birefringent polyester films may also exhibit a high melt elasticity that can be similar to other polymer film layers for co-extrusion into multilayer films. These birefringent polyester films may have a low metal content such as less than 100 ppm metal or less than 80 ppm metal or less than 30 ppm metal. The birefringent polyester film may include naphthalate units, ethylene units, a titanate compound, and a planar branching unit. The birefringent polyester film has an out-of-plane birefringence of at least 0.1 and a Tan Delta value in a range from 3 to 8. Polyethylene naphthalate (PEN) is known to have orders of magnitude higher absorption than other polymers (such as acrylates or olefins) utilized in multilayer film constructions. PEN is also known to have a different melt elasticity than other polymers (such as acrylates or olefins) utilized in multilayer film constructions. These rheological differences tend to result in layer control and uniformity issues, especially in the transverse or cross-web direction of a multilayer film construction. This disclosure describes PEN polymer and articles of film made therefrom which still provide the high levels of birefringence desired for multi-layer film applications, but also provides this performance with the previously unrealized performance combination of high % transmission (low absorption), low haze, and high melt elasticity. While the present disclosure is not so limited, an appreciation of various aspects of the disclosure will be gained through a discussion of the examples provided below.

A birefringent polyester film includes naphthalate units, ethylene units, a titanate compound, 0.1 to 2 mol % planar branching unit, based on total mol % of naphthalate and branching units, and 1 to 80 ppm metal content. The birefringent polyester film has an out-of-plane birefringence of at least 0.1 or at least 0.15 or at least 0.2 at 633 nm.

The birefringent polyester film exhibits a low metal content. The birefringent polyester film may exhibit a total metal content of less than 100 ppm, or less than 80 ppm or less than 30 ppm or less than 10 ppm or less than 5 ppm. The birefringent polyester film may exhibit a total metal content in a range from 1 to 100 ppm or in a range from 1 to 80 ppm or in a range from 1 to 30 ppm or in a range from 1 to 10 ppm or in a range from 1 to 5 ppm. The birefringent polyester film may exhibit a total metal content of 4 ppm, or 3 ppm, or 2 ppm or 1 ppm. Birefringent polyester film and particularly polyethylene naphthalate benefit from a low metal content. It is believed that one or both of optical absorption and haze is reduced by reducing the amount of metal in the polyester film.

In many embodiments, the metal content includes a titanate compound or titanium. In some embodiments, the metal content is primarily, sustainably, or only a titanate compound or titanium. The titanate compound may be utilized as a polymerization catalyst for the production of polyester. Any useful titanate compound can be utilized. The titanate compound may be a titanium alkoxide. Examples of the titanium compound or titanium alkoxide include, tetra-n-propyl titanate, tetra-i-propyl titanate, tetra-n-butyl titanate, tetra-n-butyl titanate tetramer, tetra-t-butyl titanate, tetracyclohexyl titanate, tetraphenyl titanate, and tetrabenzyl titanate. One useful titanate compound is tetra-n-butyl titanate (TBT).

The polyester polymeric materials may be described herein with reference to the overall composition, that is, 100 mol % units derived from 50 mol % carboxylate or acid units and 50 mol % glycol or diol units. Polyester polymeric materials may also be described herein with reference to the mol % of carboxylate or acid subunits and mol % glycol or diol subunits (that is, 100 mol % of carboxylate or acid subunits are reacted with 100 mol % of glycol or diol subunits in the preparation of the copolyester).

The polyester is generally made by reactions of naphthalene dicarboxylic acid (or ester) with ethylene glycol and at least one additional comonomer that contributes a planar branching unit. In some embodiments, the polyester is generally made by reactions of naphthalene dicarboxylic acid (or ester) with ethylene glycol and at least one additional comonomer that contributes branched or cyclic C4-C10 alkyl units. In further embodiments, the polyester is generally made by reactions of naphthalene dicarboxylic acid (or ester) with ethylene glycol and at least a comonomer that contributes a planar branching unit and a comonomer that contributes branched or cyclic C4-C10 alkyl units.

Suitable naphthalene carboxylate monomer molecules for use in forming the naphthalate subunits of the polyester include naphthalene carboxylate monomers that have two or more carboxylic acid or ester functional groups. The naphthalene carboxylate monomer may include naphthalene dicarboxylic acid such as 2,6-naphthalene dicarboxylic acid monomer and isomers thereof. The naphthalene carboxylate monomer may include naphthalene dicarboxylic ester such as 2,6-naphthalene dicarboxylic ester monomer and isomers thereof.

The 2,6-naphthalene dicarboxylic acid (or ester) monomer and/or isomers thereof is employed at a concentration such that 95 to 100 mol % of the carboxylate subunits comprise naphthalate subunits. Preferably, at least 96, 97, 98, 99, 99.25, 99.5 or 99.75 mol % of the carboxylate subunits comprise naphthalate subunits.

The birefringent polyester layer or film may include a planar branching unit. The planar branching unit increases the molecular weight of the polyester material while maintaining the orientation or birefringence of the birefringent polyester layer or film. The planar branching unit may be present in the birefringent polyester layer or film in an amount ranging from 0.1 to 2 mol % based on total mol % of naphthalate and branching units forming the polyester material. In many embodiments the planar branching unit may be present in the birefringent polyester layer or film in an amount ranging from 0.1 to 1 mol % based on total mol % of naphthalate and branching functional units forming the polyester material. In some embodiments, the planar branching unit may be present in the birefringent polyester layer or film in an amount ranging from 0.2 to 0.8 mol % based on total mol % of naphthalate and branching units forming the polyester material. The planar branching unit may be derived from trimesic acid or trimellitic acid, for example.

Suitable glycol monomer molecules for use in forming ethylene subunits of the polyester include ethylene glycol. In some embodiments the ethylene glycol is employed at a concentration such that 95 to 100 mol % of the diol subunits comprise ethylene subunits. Preferably, at least 97.5, 98, 98.5, 99, or 99.5 mol % of the diol subunits comprise ethylene subunits.

The birefringent polyester layer or film may include a branched or cyclic C4-C10 alkyl unit that is derived from a branched or cyclic C4-C10 alkyl glycol such as neopentyl glycol, cyclohexanedimethanol, and mixtures thereof. The branched or cyclic C4-C10 alkyl unit may be present in the birefringent polyester layer or film in an amount less than 2 mol % or less, or less than 1.5 mol %, or less than 1 mol %, based on total mol % of ethylene and branched or cyclic C4-C10 alkyl units used to from the polyester material.

The birefringent polyester layer or film may exhibit a reduced Tan Delta value. For example, a conventional PEN layer or film may exhibit a Tan Delta value in a range from 18 to 25, as measured at 280 degrees Celsius and at 10 sec$^{-1}$ shear rate, for examples. Utilizing the planar branching unit described herein may reduce the Tan Delta value in a range from 3 to 8, as measured at 280 degrees Celsius and at 10 sec$^{-1}$ shear rate, for example.

A multilayer film may include a first birefringent polyester layer having an out-of-plane birefringence of at least 0.10 or at least 0.15 or at least 0.2 at 633 nm, and a second polymer layer having a lower birefringence than the first birefringent polyester layer and disposed on the first birefringent polyester layer. The polyester layer is described above.

The second polymer layer can be isotropic or have a birefringence of less than 0.05 or less than 0.01. The term "isotropic" refers to indices of refraction (measured at 633 nm) in orthogonal x, y, and z directions are all the within 0.02 of each other, or within 0.01 of each other, or substantially equal.

In many embodiments the second polymer layer includes acrylate units. In some embodiments the second polymer layer includes olefin units. The first birefringent polyester layer and the second polymer layer may each have a Tan Delta value at 280 degrees Celsius at a shear rate of 10 sec$^{-1}$ within 3 or within 2 or within 1 of each other, or within 30% or within 25% or within 20% or within 10% of each other.

An exemplary second polymer is a polyacrylate such as polymethlymethacrylate (PMMA) for co-extrusion (commercially available under the trade designation VO44 Plexiglas from Arkema, Paris, FR), having a Tan Delta value at 280 degrees Celsius at a shear rate of 10 sec$^{-1}$ of about 7.9. Another exemplary second polymer is co-PMMA for co-extrusion (commercially available under the trade designation Atoglas 510A from Arkema, Paris, FR), having a Tan Delta value at 280 degrees Celsius at a shear rate of 10 sec$^{-1}$ of about 5.0. An exemplary second polymer is polyolefin such as polypropylene (PP) for co-extrusion (commercially available under the trade designation SR549 PP from Lyondell-Bassell, Houston, Tex.), having a Tan Delta value at 280 degrees Celsius at a shear rate of 10 sec$^{-1}$ of about 2.9. Thus, the first birefringent polyester layer may have a Tan Delta value at 280 degrees Celsius at a shear rate of 10 sec$^{-1}$ in a range from 2 to 9, or in a range from 3 to 8, or in a range from 4 to 7.

The multilayer film can have a low haze value. The multilayer film may have a haze value of 2% or less or 1.5% or less or 1% or less or 0.5% or less. The multilayer film can have a high visible light transmission. The multilayer film may have a high visible light transmission of 85% or greater, or 90% or greater A multilayer optical film includes a plurality of first birefringent polyester layers each having an out-of-plane birefringence of at least 0.10, or at least 0.15, or at least 0.2 at 633 nm and a metal content of less than 100 ppm, or less than 80 ppm, or less than 30 ppm, or less than 10 ppm, or less than 5 ppm, and having a first Tan Delta value at 280 degrees Celsius at a shear rate of 10 sec$^{-1}$, and a plurality of second isotropic layers (that may include acrylate) alternating between first birefringent polyester layers and each second isotropic layer having a second Tan Delta value at 280 degrees Celsius at a shear rate of 10 sec$^{-1}$. The first Tan Delta value is within 30% or less, or within 25% or less, or within 20% or less of the second Tan Delta value.

The second polymer layer can be isotropic or have a birefringence of less than 0.05. In many embodiments the second polymer layer includes acrylate units. The first birefringent polyester layer and the second isotropic polymer layer may each have a Tan Delta value, at 280 degrees Celsius at a shear rate of 10 sec$^{-1}$, within 3, or within 2, or within 1, of each other, or within 30%, or within 25%, or within 20%, or within 10% of each other. PMMA has a Tan Delta value, at 280 degrees Celsius at a shear rate of 10 sec$^{-1}$, of about 7.9, co-PMMA has a Tan Delta value, at 280 degrees Celsius at a shear rate of 10 sec$^{-1}$, of about 5.0, PP has a Tan Delta value, at 280 degrees Celsius at a shear rate of 10 sec$^{-1}$, of about 2.9. Thus, the first birefringent polyester layer may have a Tan Delta value, at 280 degrees Celsius at a shear rate of 10 sec$^{-1}$, in a range from 2 to 9 or in a range from 3 to 8 or in a range from 4 to 7.

The reflective and transmissive properties of multilayer optical film are a function of the refractive indices of the respective layers and the thicknesses and thickness distribution of the layers. Each layer can be characterized at least in localized positions in the film by in-plane refractive indices $n_x$, $n_y$, and a refractive index $n_z$ associated with a thickness axis of the film. These indices represent the refractive index of the subject material for light along mutually orthogonal x-, y-, and z-axes, respectively.

In practice, the refractive indices are controlled by judicious materials selection and processing conditions. A multilayer film is made by co-extrusion of a large number, e.g. tens or hundreds of layers of two alternating polymers A, B, optionally followed by passing the multilayer extrudate through one or more layer multiplication device(s), and a casting die, thus casting a web and then stretching or otherwise orienting the extrudate to form a final film. The resulting film is typically composed of many hundreds of individual layers or microlayers whose thicknesses and refractive indices are tailored to provide one or more reflection bands in desired region(s) of the spectrum, such as in the visible or near infrared.

The multilayer optical film may include at least 100 layers, or at least 300 layers, or at least 400 layers, or at least 500 layers. The multilayer optical film may include a number of layers in a range from 400 to 800, or from 500 to 700, or from 550 to 650. In some embodiments the multilayer optical film may include at least 700 layers, or at least 800 layers, or at least 900 layers, or at least 1000 layers. The multilayer optical film may include a number of layers in a range from 800 to 1500, or from 900 to 1200, or from 1000 to 1150. The layers may alternate between the first birefringent polyester layers and the second isotropic layers.

The multilayer optical film can have a low haze value. The multilayer optical film may have a haze value of 2%, or less or 1.5%, or less or 1%, or less or 0.5% or less. The multilayer optical film can form a mirror film. The mirror film may reflect at least 99.0%, or at least 99.1%, or at least 99.2%, or at least 99.3%, or at least 99.4%, or at least 99.5%, or at least 99.6% of incident light.

This reflection property may be described as "hemispheric reflectivity," $R_{hemi}(\lambda)$, meaning the total reflectivity of a component (whether a surface, film, or collection of films) when light (of a certain wavelength or wavelength range of interest) is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light for the wavelength range of interest yields the hemispheric reflectivity or $R_{hemi}(\lambda)$.

The first birefringent polyester layers may have an out-of-plane birefringence of at least 0.20 at 633 nm, and the second isotropic (for example, acrylate) layers may have an out-of-plane refractive index (measured at 633 nm) within 0.05, or within 0.04, or within 0.03, or within 0.02, or within 0.01, of an out-of-plane refractive index of the first birefringent polyester layers.

Objects and advantages of this disclosure are further illustrated by the following examples, but the particular materials and amounts thereof recited in these examples, as well as other conditions and details, should not be construed to unduly limit this disclosure.

EXAMPLES

All parts, percentages, ratios, etc. in the examples are by weight, unless noted otherwise. Solvents and other reagents used were obtained from Sigma-Aldrich Corp., St. Louis, Mo. unless specified differently.
Material Abbreviation—Generic Chemical Description—Supplier (Location)
  NDC-2,6-naphthalene dicarboxylic ester—BP Amoco (Naperville, Ill.)
  Trimesic—trimesic acid—Alfa Aesar (Ward Hill, Mass.)
  Trimellitic—trimellitic acid—Lancaster Synthesis, Inc. (Pelham, N.H.)
  EG—ethylene glycol—ME Global (Midland, Mich.)
  CHDM—cyclohexane dimethanol—Eastman (Kingsport, Tenn.)
  TEPA—Triethylphosphonoacetate—Rhodia (Cranbury, N.J.)
  Na Acetate—sodium acetate—Alfa Aesar (Ward Hill, Mass.)
  Co Acetate—cobalt acetate—Shepherd Chemical (Cincinnati, Ohio)
  Mn Acetate—manganese acetate—Shepard Chemical (Middletown, Ohio)
  Sb Acetate—antimony triacetate—Arkema (Philadelphia, Pa.)
  Ca Acetate—calcium acetate—Mallinckrodt Chemical Inc. (St. Louis, Mo.)

All polymers in the examples below were synthesized according to the following procedure:

A room temperature 10 gallon stainless steel, oil jacketed batch reactor was charged with amounts of monomers and catalysts indicated in Table 1 below. The contents were pressurized to 239.2 kPa utilizing nitrogen and heated to 257° C. During transesterification, the resultant methanol and water by-product was removed via separation column. After the methanol and water were removed, the batch pressure was reduced to atmospheric pressure. In some cases, the stabilizer TEPA was added to the batch at this point. The batch was then heated to 280° C. and the pressure was reduced (via vacuum) to below 500 Pa. The condensation reaction by-product, ethylene glycol, was continually removed via separation column until a polymer resin achieved the desired viscosity build associated with a polyethylene naphthalate resin with an intrinsic viscosity of about 0.50 dL/g, as measured in 60/40 wt % phenol/o-dichlorobenzene at 30° C., was produced.

TABLE 1

| | Example # | | | | |
|---|---|---|---|---|---|
| | C-1 | A-1 | A-2 | A-3 | A-4 |
| Esters & Acids charges (kg) | | | | | |
| NDC | 22.17 | 22.17 | 22.17 | 22.17 | 22.17 |
| Trimesic | | | 0.143 | 0.048 | 0.096 |
| Diol charges (kg) | | | | | |
| EG | 12.96 | 12.96 | 13.06 | 12.94 | 13.03 |
| CHDM | | | | 0.131 | |
| Catalyst charges (g) | | | | | |
| Mn Acetate | 4.88 | | | | |
| Co Acetate | 5.1 | | | | |
| Sb Acetate | 10.64 | | | | |
| Ca Acetate | | | | | |
| Na Acetate | | | | | 4.45 |
| TBT | | 1.11 | 1.12 | 1.11 | 1.11 |
| Stabilizer charge (g) | | | | | |
| TEPA | 9.09 | | | | |

Table 2 lists the resultant composition of the polymers in these examples. Monomers are represented on a molar basis in which the ester and acid functional monomers are grouped to add to 100% and the glycol functional monomers are grouped to add to 100%. Catalysts and stabilizers are listed on a PPM basis.

TABLE 2

| | Example # | | | | |
|---|---|---|---|---|---|
| | C-1 | A-1 | A-2 | A-3 | A-4 |
| Esters/Acids (mol %) | | | | | |
| NDC | 100% | 100% | 99.25% | 99.75% | 99.50% |
| Trimesic | | | 0.75% | 0.25% | 0.50% |
| Diols (mol %) | | | | | |
| EG | 100% | 100% | 100% | 99% | 100% |
| CHDM | | | | 1% | |
| Catalysts (PPM) | | | | | |
| Mn Acetate | 49 | | | | |
| Co Acetate | 54 | | | | |
| Sb Acetate | 195 | | | | |
| Ca Acetate | | | | | |
| Na Acetate | | | | | 56 |
| TBT | | 7 | 7 | 7 | 7 |
| Total metals (PPM) | 299 | 7 | 7 | 7 | 63 |
| Stabilizer | | | | | |
| TEPA | 57 | | | | |

The resultant resins were assessed for polymerization reaction kinetics, thermal stability, viscoelasticity and quench morphology and are compared in Table 3.

Resin kinetics are compared by the amount of time (in minutes) it takes for the resin to achieve the desired viscosity build associated with a 0.48 IV target.

Thermal stability of the resin samples is determined by placing ~5 gram samples of dry resin into a 280 degree Celsius, nitrogen purged plate-on-plate Ares Rheometer (commercially available from TA Instruments, New Castle, Del.) measuring the complex viscosity of the resin at the start of the test and comparing this result to the complex viscosity after 30 additional minutes at 280 degrees Celsius in the rheometer. Results are reported on a relative basis (100%=initial value). All measurements are conducted at a shear rate of 100 sec$^{-1}$.

Viscoelasticity of the resins is compared utilizing the calculated Tan Delta value of these resins, also generated from the 280 degree Celsius nitrogen purged plate-on-plate Ares rheometer at a shear rate of 10 sec$^{-1}$. Tan Delta value is calculated as the ratio of viscous modulus (G") to elastic modulus (G') and is a useful quantifier of the presence and extent of elasticity in a fluid (lower values=more elasticity).

Quench morphology is measured via Differential Scanning calorimetry (DSC) test method. The materials were tested using DSC (Q2000 commercially available from TA Instruments, New Castle, Del.). A sample of about 5-10 mg was used for each resin. In particular, the resins are heated (melted) to 300 degree Celsius and then cooled at a controlled rate (at either 5 degree C./min or 10 degree C./min). Quench morphology can be characterized by measuring the energy deviation associated with the resultant crystallization peak during this cooling cycle (larger energy values correlates to greater crystallization).

TABLE 3

| | Example # | | | | |
|---|---|---|---|---|---|
| | C-1 | A-1 | A-2 | A-3 | A-4 |
| Esters/Acids (mol %) | | | | | |
| NDC | 100% | 100% | 99.25% | 99.75% | 99.50% |
| Trimesic | | | 0.75% | 0.25% | 0.50% |
| Diols (mol %) | | | | | |
| EG | 100% | 100% | 100% | 99% | 100% |
| CHDM | | | | 1% | |
| Catalysts (PPM) | | | | | |
| Mn Acetate | 49 | | | | |
| Co Acetate | 54 | | | | |
| Sb Acetate | 195 | | | | |
| Ca Acetate | | | | | |
| Na Acetate | | | | | 56 |
| TBT | | 7 | 7 | 7 | 7 |
| Total metals (PPM) | 299 | 7 | 7 | 7 | 63 |
| Stabilizer | | | | | |
| TEPA | 57 | | | | |
| Polymerization Time (min) | 95 | 75 | 45 | 75 | 45 |
| Thermal Stability | 105% | 99% | 104% | 102% | 104% |
| Tan Delta | 19.9 | 14.9 | 3.2 | 6.5 | 5.0 |
| Quench Morphology (J/g) @5 C./min | 47 | 42.9 | 40.5 | 13.3 | 33.9 |
| Quench Morphology (J/g) @10 C./min | 18.8 | 6.3 | 4.6 | 1.3 | 3.5 |

Table 4 below provides Tan Delta values for exemplary polymer resins (acrylates or olefins), that can be co-extruded with the polyester resins described herein. An exemplary acrylate is a PMMA commercially available under the trade designation VO44 Plexiglas PMMA commercially from Arkema (Paris, FR.). Another exemplary acrylate is a co-PMMA commercially available under the trade designation Atoglas 510A co-PMMA commercially from Arkema (Paris, FR.). An exemplary olefin is PP is SR549 PP available from Lyondell-Bassell (Houston, Tex.).

TABLE 4

| Polymer Type | Tan Delta | | |
|---|---|---|---|
| | 260 C. | 270 C. | 280 C. |
| PMMA | 4.1 | 5.8 | 7.9 |
| CoPMMA | 3.4 | 4.1 | 5.0 |
| PP | 2.7 | 2.8 | 2.9 |

Thus, the polyester resins described herein may have a Tan Delta value in range from about 3 to about 8 to provide a similar melt or viscoelasticity as the a coextruded resin to provide uniform physical and optical properties across the machine and transverse direction of a coextruded film.

The example polyesters were then extruded through a twin-screw extruder, necktube, feedblock and die, with a progressive temperature profile peaking at 282° C. The extruded material was cast and quenched into 20 mil films. The cast web films were evaluated for transmission performance and % haze.

These 20 mil cast web films were oriented and annealed in a KARO IV laboratory stretching machine (Brueckner Maschinenbau GmbH & Co. KG, Siegsdorf, Germany). Simultaneous biaxial stretching in the machine and transverse directions to 350%x350% of original length was achieved using a 140 degree Celsius oven with a 45 sec preheat time. These oriented films were subject to an addition 10 sec of annealing at 240 degree Celsius. The oriented films were evaluated for haze and for birefringence.

Refractive Index (RI) measurement: The refractive indices of the various samples were measured using a Metricon Prism coupler (Metricon Corporation, Pennington, N.J.) in the MD, TD, and TM directions. MD and TD are in-plane directions and TM is normal to the film surface. The refractive indices of MD, TD and TM are labeled as: nx, ny, and nz, respectively.

In-Plane Birefringence, $\Delta n_{in}$: In order to measure the birefringent nature of a uniaxially stretched film, in-plane birefringence is used. In-plane birefringence concerns the difference of the indices (nx and ny) in the orthogonal in-plane directions. More specifically for a uniaxially stretched film, in-plane birefringence refers to the difference between the stretching direction and the non-stretching direction. For example, assuming a film is uniaxially stretched in MD direction, the in-plane birefringence is expressed as the following:

$$\Delta n\ in = n_x - n_y$$

Where nx is the refractive index in the stretching direction (in this case, MD), and ny is the non-stretching direction (in this case, TD).

For a biaxially stretching film, the in-plane birefringence is relatively small and sometimes close to zero if balanced. Instead, out-of-plane birefringence is more indicative of the birefringent nature of the stretched film.

Out-of-Plane Birefringence, $\Delta n_{out}$: In order to measure the birefringent nature of a biaxially oriented film, out-of-plane birefringence is used. Out-of-plane birefringence concerns the difference between average of in-plane indices (MD and TD) and the index normal to the film (TM). Out-of-plane birefringence can be expressed as following:

$$\Delta n_{out} = ((n_x + n_y)/2) - n_z$$

Where nx is the refractive index (RI) in the machine direction (MD) and ny is the refractive index (RI) in the transverse direction (TD) and nz is the refractive index (RI) in the thickness direction (TM).

Haze measurements were conducted using a BYK Hazegard Haze Meter from BYK-Gardner GmbH, Geretsried, Germany.

Transmission was measured at 600 nm using a Lambda 950 spectrophotometer (from Perkin-Elmer, Akron, Ohio).

TABLE 5

| | Example # | | | | |
|---|---|---|---|---|---|
| | C-1 | A-1 | A-2 | A-3 | A-4 |
| Esters/Acids (mol %) | | | | | |
| NDC | 100% | 100% | 99.25% | 99.75% | 99.50% |
| Trimesic | | | 0.75% | 0.25% | 0.50% |
| Diols (mol %) | | | | | |
| EG | 100% | 100% | 100% | 99% | 100% |
| CHDM | | | | 1% | |
| Catalysts (PPM) | | | | | |
| Mn Acetate | 49 | | | | |
| Co Acetate | 54 | | | | |
| Sb Acetate | 195 | | | | |
| Ca Acetate | | | | | |
| Na Acetate | | | | | 56 |
| TBT | | 7 | 7 | 7 | 7 |
| Total metals (PPM) | 299 | 7 | 7 | 7 | 63 |
| Stabilizer | | | | | |
| TEPA | 57 | | | | |
| % Transmission (20 mils) | 87.9 | 86.8 | 88.5 | 88.5 | 88.1 |
| Castweb (20 mil) Haze | 1.3 | 1.5 | 0.8 | 0.8 | 0.5 |
| Oriented film % Haze | 0.8 | 0.4 | 0.3 | 0.2 | 0.4 |
| Oriented in-plane index | 1.749 | 1.750 | 1.747 | 1.744 | 1.747 |
| Oriented out-of-plane index | 1.493 | 1.492 | 1.494 | 1.497 | 1.496 |

Examples A-5 to A-8

All polymers in the examples A-5 to A-8 below were synthesized according to the following procedure: A room temperature 2 gallon stainless steel, electrically heated and insulated batch reactor was charged with amounts of monomers and catalysts indicated in Table 6. The contents were pressurized to 239.2 kPa utilizing $N_2$ and heated to 257° C. During transesterification, the resultant methanol and water by-product was removed via separation column. After the methanol and water were removed, the batch pressure was reduced to atmospheric pressure. The batch was then heated to 280° C. and the pressure was reduced (via vacuum) to below 500 Pa. For examples A-5, A-7 and A-8, the condensation reaction by-product, ethylene glycol, was continually removed via separation column until a polymer resin achieved the desired viscosity build associated with a polyethylene naphthalate having an intrinsic viscosity of about 0.50 dL/g, as measured in 60/40 wt % phenol/o-dichlorobenzene at 30° C., was produced. For batch A-6, the condensation reaction was unable to proceed to a viscosity build associated with a ~0.50 dL/g endpoint, topping out at a reduced viscosity, resulting in a polymer with reduced physical properties.

TABLE 6

| | Example # | | | |
|---|---|---|---|---|
| | A-5 | A-6 | A-7 | A-8 |
| Esters & Acids charges (kg) | | | | |
| NDC | 4.1 | 4.1 | 4.1 | 4.1 |
| Trimellitic | | | | 0.0177 |
| Trimesic | 0.0177 | 0.0177 | | |
| Diol charges (kg) | | | | |
| EG | 2.41 | 2.41 | 2.4 | 2.41 |
| CHDM | | | | |
| Catalyst charges (g) | | | | |
| Mn Acetate | | | | |
| Co Acetate | | | | |
| Sb Acetate | | | | |
| Ca Acetate | | | | |
| Na Acetate | | | | |
| TBT | 0.1 | 0.05 | 0.1 | 0.21 |
| Stabilizer charge (g) | | | | |
| TEPA | | | | |

Table 7 lists the resultant composition of the polymers in these examples. Monomers are represented on a molar basis in which the ester and acid functional monomers are grouped to add to 100% and the glycol functional monomers are grouped to add to 100%. Catalysts and stabilizers are listed on a PPM (parts per million) basis.

Resin kinetics are also compared in Table 7 by the amount of time (in minutes) it takes for the resin to achieve the desired viscosity build associated with a 0.48 IV target. As Example A-6 did not reach endpoint, a result of n.a. (not applicable) is indicated. Complex viscosity as measured by an Ares plate-on-plate viscometer at 100 $sec^{-1}$ at 280° C. is included for reference.

TABLE 7

| | Example # | | | |
|---|---|---|---|---|
| | A-5 | A-6 | A-7 | A-8 |
| Esters/Acids (mol %) | | | | |
| NDC | 99.5% | 99.5% | 100.0% | 99.5% |
| Trimellitic | | | | 0.5% |
| Trimesic | 0.5% | 0.5% | | |
| Diols (mol %) | | | | |
| EG | 100% | 100% | 100% | 100% |
| CHDM | | | | |
| Catalysts (PPM) | | | | |
| Mn Acetate | | | | |
| Co Acetate | | | | |
| Sb Acetate | | | | |
| Ca Acetate | | | | |
| Na Acetate | | | | |
| TBT | 3 | 2 | 3 | 7 |
| Total metals (PPM) | 3 | 2 | 3 | 7 |
| Stabilizer | | | | |
| TEPA | | | | |
| Polymerization Time (min) | 90 | n/a | 125 | 60 |
| Complex Viscosity (P) | 3298 | 1363 | 3064 | 3707 |

Thus, embodiments of BIREFRINGENT POLYESTER FILM WITH LOW METAL CONTENT are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A birefringent polyester film comprising:
   naphthalate units;
   ethylene units;
   a titanate compound;
   0.1 to 2 mol % planar branching unit, based on total mol % of naphthalate and branching units;
   1 to 80 ppm total metal content; and
   an out-of-plane birefringence of at least 0.1 at 633 nm,
   wherein the film has a Tan Delta value, at 280 degrees Celsius and a shear rate of 10 sec$^{-1}$, in a range from 3 to 8.

2. The film according to claim 1, further comprising branched or cyclic C4-C10 alkyl units present in an amount less than 2 mol % based on total mol % of ethylene and branched or cyclic C4-C10 alkyl units.

3. The film according to claim 1, wherein the metal content ranges from 3 to 30 ppm.

4. The film according to claim 1, wherein the titanate compound comprises tetrabutyl titanate.

5. The film according to claim 1, wherein the planar branching unit is derived from trimesic acid or trimellitic acid.

6. A multilayer film comprising:
   a first polymer layer comprising a birefringent polyester layer having an out-of-plane birefringence of at least 0.10 at 633 nm, the polyester layer comprises:
   naphthalate units;
   ethylene units;
   a titanate compound;
   0.1 to 2 mol % planar branching unit, based on total mol % of naphthalate and branching units; and
   1 to 80 ppm metal content,
   wherein the film has a Tan Delta value, at 280 degrees Celsius and a shear rate of 10 sec$^{-1}$, in a range from 3 to 8; and
   a second polymer layer having a lower birefringence than the first birefringent polyester layer and disposed on the first birefringent polyester layer.

7. The multilayer film according to claim 6, wherein the second polymer layer comprises acrylate units.

8. The multilayer film according to claim 6, wherein the second polymer layer is isotropic.

9. The multilayer film according to claim 6, wherein the first birefringent polyester layer has an out-of-plane birefringence of at least 0.20 at 633 nm.

10. The multilayer film according to claim 6, wherein the first birefringent polyester layer further comprises branched or cyclic C4-C10 alkyl units present in an amount less than 2 mol % based on total mol % of ethylene and branched or cyclic C4-C10 alkyl units.

11. The multilayer film according to claim 6, wherein the first birefringent polyester layer metal content ranges from 3 to 30 ppm.

12. The multilayer film according to claim 6, wherein the titanate compound comprises tetrabutyl titanate.

13. The multilayer film according to claim 6, wherein the planar branching unit is derived from trimesic acid or trimellitic acid.

14. The multilayer film according to claim 6, wherein the first birefringent polyester layer and the second polymer layer each have a Tan Delta value, at 280 degrees Celsius and a shear rate of 10 sec$^{-1}$, within 3 of each other.

* * * * *